United States Patent

[11] 3,603,060

[72] Inventor Charles Kay
Wyoming, Mich.
[21] Appl. No. 826,207
[22] Filed May 20, 1969
[45] Patented Sept. 7, 1971
[73] Assignee J. Raymond Christy Enterprises, Inc.
Grand Rapids, Mich.

[54] STRUCTURAL BUILDING SYSTEM
4 Claims, 11 Drawing Figs.
[52] U.S. Cl. .................................................. 52/281,
52/284, 52/404, 52/562, 52/593
[51] Int. Cl. .......................................................... E04b 2/16,
E04c 1/10
[50] Field of Search ............................................ 52/562,
564, 565, 593, 285, 284, 281, 615, 496, 617, 404,
406, 410, 241, 238, 282, 286, 270, 271, 474, 475,
613, 614

[56] References Cited
UNITED STATES PATENTS

| | | | |
|---|---|---|---|
| 2,362,162 | 11/1944 | Sheldon......................... | 52/271 X |
| 2,401,587 | 6/1946 | Smith ............................ | 52/474 |
| 2,480,612 | 8/1949 | Sherman ....................... | 52/562 X |
| 3,001,613 | 9/1961 | McBerty....................... | 52/405 X |
| 3,286,428 | 11/1966 | Kay ................................ | 52/562 X |
| 3,350,824 | 11/1967 | Wiebusch..................... | 52/496 X |
| 3,452,498 | 7/1969 | Kinsey.......................... | 52/284 X |

Primary Examiner—Price C. Faw, Jr.
Attorney—Price, Heneveld, Huizenga & Cooper

ABSTRACT: A low-cost, high quality structural building system of interlocking hollow components which fulfill the structural and decorative requirements of both the interior and exterior surfaces of walls, or both surfaces of interior partitions, floors, ceilings, and rooves if desired, with windows and doors being interlockable therein, the components collectively enclosing the skeletal structural supports which complement these components, and to which these components are anchored.

PATENTED SEP 7 1971

INVENTOR
CHARLES KAY
BY
ATTORNEYS

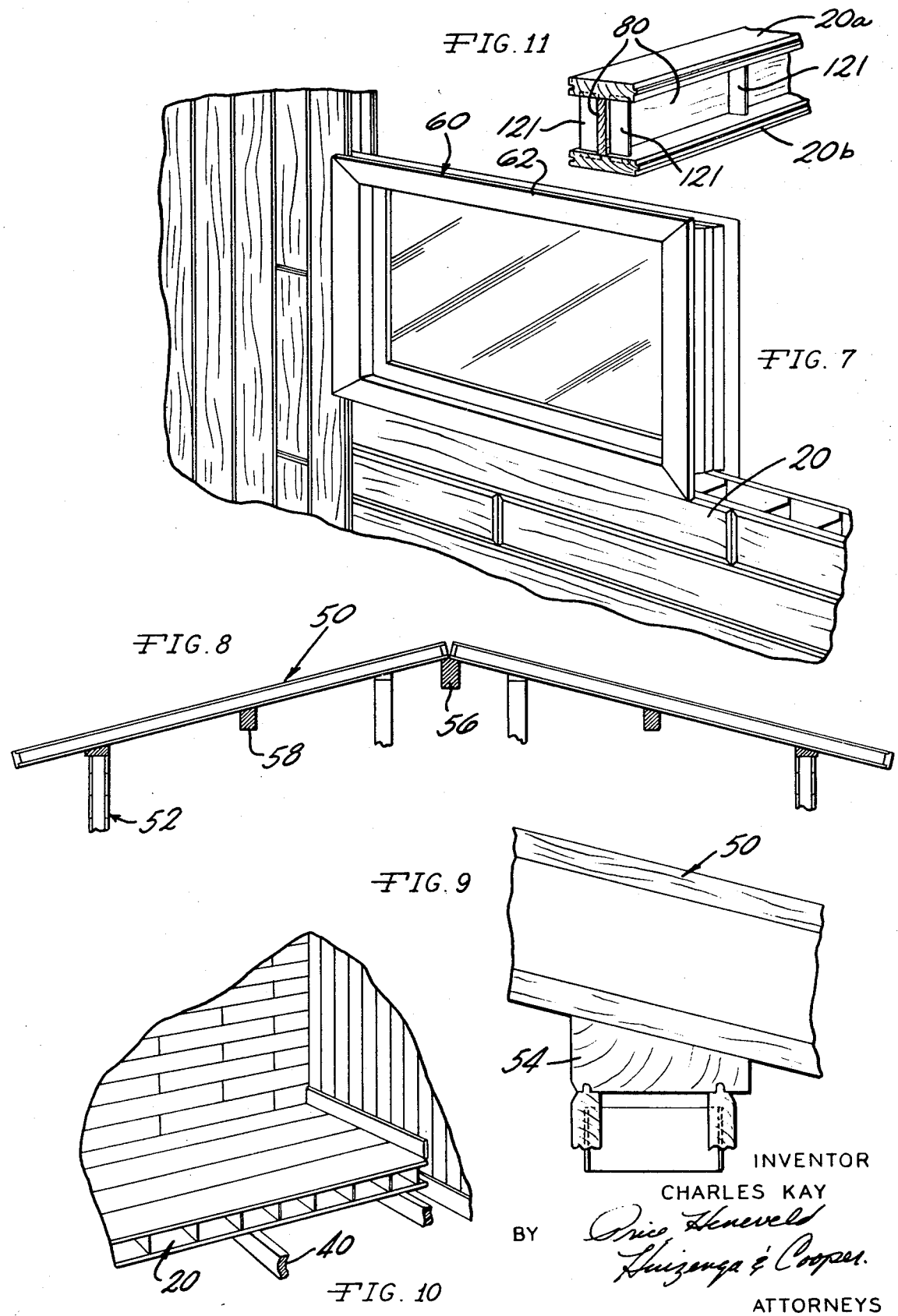

STRUCTURAL BUILDING SYSTEM

BACKGROUND OF THE INVENTION

This invention relates to building construction, and more particularly to a building system employing similar cooperative interlocking hollow components with an interlocked skeletal framework.

In recent years, the tremendous increase in cost of and shortage of supply of both building materials and skilled labor have contributed significantly to the housing shortage and high-cost problems. As is well known, conventional construction of houses and similar buildings employs a tremendous quantity of lumber, including closely spaced and anchored studs for wall structural support, closely spaced beams and rafters for overhead structural support, and several layers of internal and external support and decorative materials, usually plywood sheeting. Upon these are applied decorative layers of plastic, paper, paint, wood paneling, etc. To construct a structure employing these materials and techniques requires exceptional skill, a great amount of time, and a very substantial amount of money, as is well known.

In my U.S. Pat. No. 3,286,428 is set forth a wall constructed of novel block elements. This present invention constitutes an improvement of that structure in this prior patent employing a unique combination of elements of this type interlocked with skeletal framework elements encompassed within the elements.

SUMMARY OF THE INVENTION

It is an object of this invention to provide a building construction with double face structural panels for exterior-interior structural walls, interior partition walls, ceilings, floors, and roofs. These are rapidly formed and securely anchored using an interlocked skeletal framework, the framework becoming completely enclosed within the panel. The electrical wiring, plumbing, thermal insulation, and heating and cooling ducts are enclosed within the panel. The window and door casings are interlocked as integral portions of the panel in desired number and locations.

An entire building can be erected rapidly, with a minimum of skill and at a fraction of the cost of conventional construction.

The building elements are specially made to be anchored to the framework components and encompass the components.

These and other objects, features and advantages will become apparent upon studying the following specification in conjunction with the drawings.

BRIEF DESCRIPTION OF THE DRAWINGS

FIG. 7 is an enlarged fragmentary view showing a partition according to this invention into which a window is interlocked;

FIG. 8 is a fragmentary elevational view of a building wall and roof construction made in accordance with the teachings of this invention;

FIG. 9 is a fragmentary enlarged view of a portion of the structure in FIG. 8;

FIG. 10 is a fragmentary perspective view showing a floor and wall construction made in accordance with the teachings of this invention; and FIG. 11 is a fragmentary perspective view of a portion of a modified element of the system.

DESCRIPTION OF THE PREFERRED EMBODIMENTS

Figure 1:
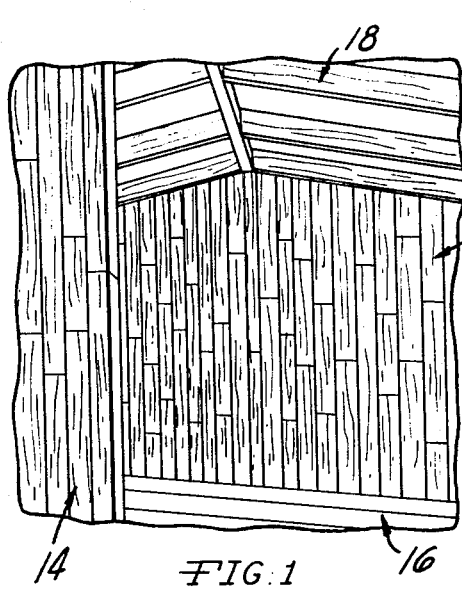
FIG. 1 is a fragmentary perspective view of the interior of a portion of a building constructed according to this invention.
Figure 6:
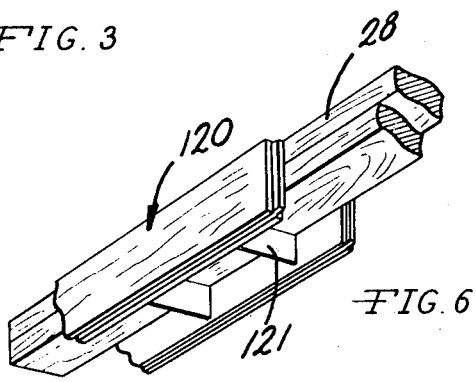
FIG. 6 is a fragmentary perspective view of the upper portion of a partition made in accordance with this invention.

In FIG. 1, building construction 10 includes an end wall partition 12, an interior wall partition 14, a floor partition 16, and a combined ceiling-roof partition 18. Partitions 12, 14, and 16 are made in accordance with the teachings of this invention. Each of these partitions is composed of a plurality of interfitting double wall elements of elongated configuration, and interlocked structural skeletal struts encompassed within the elements. The elongated elements may be vertically arranged as in FIG. 2, or horizontally arranged as in FIG. 3 or FIG. 2. These are specially interfitted with the structural framework members, normally "two by fours" which may take the form of a toe plate 22, upstanding studs 24 and 26, and cap plates 28 (FIG. 6) sometimes referred to herein as "struts."

Each of elements 20 is composed of a pair of like elongated panels 20a and 20b interconnected by a plurality of spaced transverse metal connecting plates 21. These are normally in the range of about 0.015 to about 0.060 inch thickness. Elements 20 may be of any desired length, e.g. the full length of the partition, or a fractional portion thereof. These elements are capable of being interfitted with each other by means of elongated grooves and tongues on opposite edges of each of the panels 20a and 20b, i.e., along their length, and preferably also tongue and groove connections on ends of the panels i.e., along the heights of the panels, as that term is used herein. Normally, panels 20a and 20b are made of wood, but other materials could conceivably be employed. Plates 21 are normal to, extend between, and interconnect panels 20a and 20b, with the ends of plates 21 having transverse flanges generally parallel with panels 20a and 20b and normal to the remainder of the plate. These flanges and adjacent end portions of the plates are embedded in panels 20a and 20b to securely interlock them prior to construction of the building. Plates 21 normally have a length a little less than the width of panels 20a and 20b for full support.

Of plurality of elements 20 interfitted in a partition, those at the edge of the particular partition, i.e. "edge elements" are of special construction to enable the integrated structure to be formed in a special manner. Specifically, these edge elements 120 have different dimensioned plates interconnecting the panels. These plates 121 have a plate length less than the height of the panels by an amount at least equal to the width of the skeletal framework struts, normally a nominal "two by four," to enable these edge elements to each receive and encompass the width of at least one of these skeletal strut members within its confines, whether such skeletal support strut member be a toe plate as at 22, a cap or double cap as at 28, a stud as at 24 and 26, or other. The short plates 121 are offset toward one edge of the panels to which they are joined, in aligned relation, enabling the skeletal strut member to lie alongside them within the confines of the double panel element 20a. Assembly thereof is explained hereinafter.

Although the number of a skeletal strut members can be varied, only a relatively small number of these framework members need be used. Thus, to erect a vertical partition as 14 in FIG. 1, using vertically extending elements 20, it is only necessary to attach a toe plate, e.g. 22 to the floor, attach a corresponding aligned cap adjacent the ceiling, cut elements 20 to length, interengage the tongues and grooves of a plurality of these elements 20 while sliding them over the toe plate and cap, and anchor them to the toe plate and cap with nails. The special edge elements are employed on the ends of the formed partition, with a pair of upstanding studs being received therein. The wall panel shown on the right side of FIG. 2 would thus be formed for example from right to left, with special edge element 120 being the last one to be attached to the toe and cap plates. Then stud 24 would be placed between the panels of edge element 120 and tacked thereto as well as to the toe and cap plates. If the wall is long, extra strength may be added by forcing one or more "two by fours" horizontally between the collective panels and between the plates prior to attaching this last stud.

Figure 2:
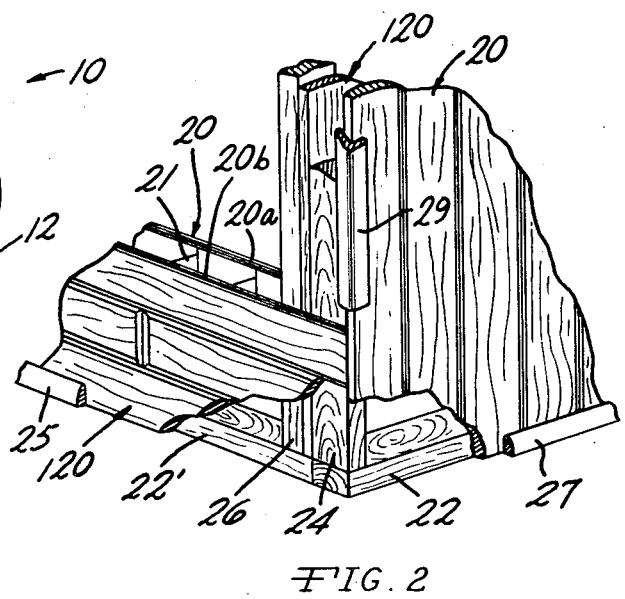
FIG. 2 is a fragmentary enlarged perspective view of a corner conjunction of two partitions of a structure made according to this invention.

With completion of this partition, if it is desired to extend another partition therefrom, e.g. as at the left side of FIG. 2, this may be done using either vertically oriented or horizontally oriented elements 20. If the horizontally oriented technique is to be employed as illustrated in FIG. 2, stud 26 is attached to the outside of one of the panels of edge element 120 and a new toe plate 22' is attached to the floor extending normal studs 24 and 26 and normal to toe plate 22. Hence, the skeletal framework extends in three dimensions from the common corner point. Another special edge element 120 is then placed with its metal plates adjacent its upper edge and its receiving space down over toe plate 22' so that its panels straddle the width of the toe plate and its plates are immediately adjacent and above it. Then several elements 20 are interfitted one atop the other to form the main body of the partition. Preferably the outer panel 20b of each of these elements extends beyond studs 24 and 26 to cover them while the inner panels 20a abut the inner surface of the previously formed partition. Suitable trim strips 25 and 27 may be used to dress off the edges of the partition. Also a corner trim strip 29 may be employed at the junctures of the two partitions.

Figure 3:
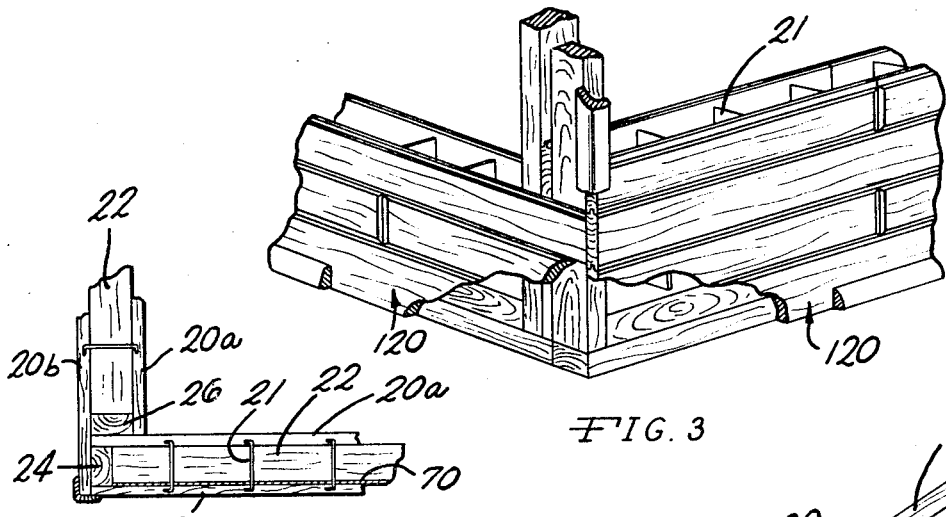
FIG. 3 is a fragmentary enlarged perspective view of a modified corner of two joining partitions of a structure made according to this invention.

If it is desired to have elements 20 and 120 horizontal in both partitions as illustrated in FIG. 3, this is readily done as by building up one partition first, specifically that on the right side of FIG. 3 and then building up the other partition after adding the appropriate corner studs. In this case also, the skeletal framework extends in three dimensions from the corner junction. In addition to the struts represented by the toe plates, cap plates, and corner studs, these partitions may be further reinforced by inserting additional "two by fours" or other equivalent struts through a series of the elements 20 between their metal plates 21.

If the structure of the novel type is used to form the floor partition, not only can supports extend inside elements 20, but joists (FIG. 10) can extend beneath them for additional support if desired. This type of construction can also be used for the roof-ceiling partition (FIG. 8) as well as internal-external walls 52. Elongated pitch blocks 54 (FIG. 9) interjoin the angular roof partition with the vertical wall partition by having an appropriately slanted upper surface and interfitting with the wall partitions as by the tongue and groove connections. This would cooperate with, for example, a center beam 56 and supplemental beams 58 if necessary.

If desired, the same partition such as the wall illustrated in FIG. 7 may include some elements oriented on a vertical basis and other adjacent elements on the horizontal basis. Further, window and door frames can be readily interfitted directly with it such as is illustrated by the window in FIG. 7. This window assembly 60 includes a peripheral frame 62 that has a generally U-shaped receiving recess on its outer periphery to receive and interfit with elements 20 as the latter are assembled. Such a construction enables rapid interlocking assembly of all of the structural components.

The hollow nature of elements 20 enables the electrical wiring, plumbing, insulation, heating ducts, cooling ducts, and the like to be readily installed into the structures while being enclosed. The potential variations of the structure using the regular elements, the edge elements and the interlocked skeletal members are almost endless. Structural tests conducted for Government low cost housing projects have proven high strength capacities and esthetic structure while enabling construction at a fraction of the cost of conventional construction, and in a fraction of the time. The unique interlocking nature and strength of the elements and skeletal members enables only tacking with small nails for the finishing touches, so that when assembled, no further finish coatings such as paper, vinyl, paint or the like are necessary.

Figure 4:
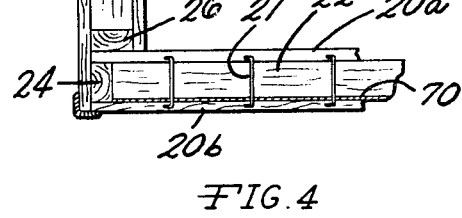
FIG. 4 is a fragmentary plan view of the construction in FIG. 3.
Figure 5:
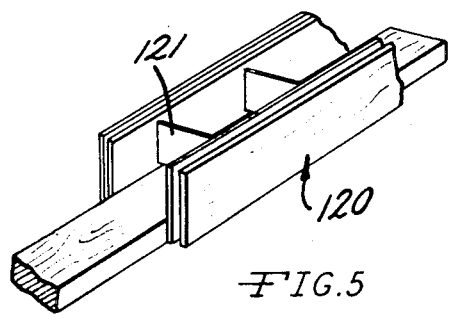
FIG. 5 is a fragmentary perspective view showing the lower portion of one of the partitions in FIG. 3.

The elements 20 also enable coating of the inner face of one or both the inner and outer panels 20a and 20b with a shiny radiant heat reflector coating 70 (FIG. 4) prior to assembly into the partitions. This can be supplemented by loose thermal insulation filling to minimize heat conductance.

Further, it has been found that the strength of the elements can be greatly increased, as for usage in a floor, by inserting an elongated transverse cross piece 80 that extends between the panels 20a and 20b, retained in place by pairs of partial plates 121 as in FIG. 11. Additional variations may be apparent to those in the trade.

The embodiments of the invention in which an exclusive property or privilege is claimed are defined as follows.

1. A partition of a building structure comprising: a skeletal framework and a plurality of elongated interfitted structural elements, each such element being formed of a pair of spaced, parallel panels having a height, a length, and a predetermined spacing therebetween, and being interconnected by spaced metal plates therebetween transverse to said panels, and having flanges transverse to said plates embedded in said panels; said plurality of elements including special edge elements; said skeletal framework including spaced parallel struts having a width greater than their thickness; said panels of said edge elements being spaced sufficiently to receive said strut width therebetween; said edge elements having plates of a plate length less than the height of said panels by an amount at least the thickness of said struts to enable said edge elements to each receive a strut therein; and said edge elements being anchored to said struts.

2. The partition in claim 1 wherein said skeletal framework includes second struts normal to said struts received by said edge elements; and said structural elements collectively receiving said second struts between the panels thereof and being secured thereto.

3. The partition in claim 1 wherein said panels of said elements have finished exterior surfaces.

4. A pair of integral load-bearing partitions of a building structure comprising: skeletal framework and a plurality of elongated interfitted structural elements interlocked therewith; said framework including first, second, and third strut means extending from a common corner in three dimensions normal to each other; said structural elements being in two groups, each group forming one of the structural load-bearing partitions; each of said groups being anchored to two of said strut means and one of said strut means being common to both groups; said structural elements each being formed of a pair of spaced parallel panels interconnected by spaced rigid metal plates therebetween transverse to said panels and having flanges transverse to said plates and embedded in said panels; the edgemost ones of said structural elements in each group having plates of a length substantially less than the width of said panels to receive and envelope said strut means between said panels; and elements in both of said groups enveloping said one strut means.